United States Patent Office 3,189,622
Patented June 15, 1965

3,189,622
PROCESS FOR THE PREPARATION OF 16α-BROMO- AND 16α-IODOPREGNANES
John M. Beaton, Portage Township, Kalamazoo County, Mich., assignor to The Upjohn Company, Kalamazoo, Mich., a corporation of Delaware
No Drawing. Filed Dec. 11, 1963, Ser. No. 329,864
7 Claims. (Cl. 260—397.4)

The present invention relates to a novel process for the preparation of steroid compounds and is more particularly concerned with the preparation of 16α-bromo- and 16α-iodopregnanes.

The process consists in the isomerization of 16β-bromo- or respectively 16β-iodo steroids of the pregnane series to 16α-bromo or respectively 16α-iodo steroids of the pregnane series with the aid of Raney nickel in high yields. 16β-iodo- and 16β-bromo steroids of the pregnane series are well known and have been generally prepared by subjecting a 16α,17α-oxido-pregnane compound to the action of hydrobromic or respectively hydroiodic acid. Under these conditions a 16β-bromo-(or iodo)-17α-hydroxypregnane compound is obtained.

The terms "pregnane" and "compound of the pregnane series" are herein used generically for compounds having the basic structure below

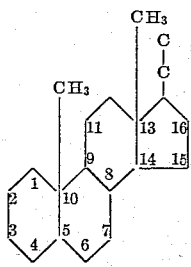

and having frequently substituents, particularly: in positions 3, 11 and 20, hydroxy, acyloxy and oxo groups; in position 6, methyl and fluoro; in position 9, fluoro; and double bonds in positions 1,2, 4,5, 5,6, 6,7; and the like. Other substituents such as methyl, hydroxy, and acyloxy in positions 2, 4, 7, 12, 14 or 15 may also be present, as they do not interfere with the isomerization process.

The main object of this invention is to provide a high yield method for the production of 16α-halo-17α-hydroxypregnanes, since the biological activity of 16α-halo-17α-hydroxypregnanes is far superior to those of the 16β-halo-17α-hydroxypregnanes. Thus, the 16β-fluoro derivatives of hydrocortisone, 9α-fluoro-hydrocortisone acetate and 9α-fluoroprednisolone exhibit lower anti-inflammatory activity than the parent compounds [Moreland et al., Chem. and Ind. 1084 (1960)]. Other tests have shown that the anti-inflammatory activity (Granuloma Pouch Test) of 9α,16β-difluoroprednisolone acetate is about equal to hydrocortisone (=1) while the α-isomer, 9α,16α-difluoroprednisone acetate, possesses 77 times the anti-inflammatory activity of hydrocortisone. Beyler et al. [J. Org. Chem. 21, 572 (1956)] report 16β-chlorocortisone to be inactive as an anti-inflammatory agent. On the other hand the 16α-fluoro compounds disclosed in U.S. Patents 2,915,434, 2,915,435 and 3,033,747 are all very active compounds. Similarly, Belgian Patent 623,567 shows the high activity of 16α-chloroprednisolones. Although 16β-bromo-cortisone acetate is known [Julian et al., J. Am. Chem. Soc. 77, 4601 (1955)], no remarkable activity thereof has been acknowledged.

Consequently 16β-halo steroids found applications only as intermediates. No method has been heretofore known to convert 16β-halopregnanes to 16α-halopregnanes, which latter compounds are of significant biological activity.

The novel process of the present invention is therefore useful for the preparation and in the preparation of valuable therapeutically and biologically active 16α-bromo- (or iodo)-17α-hydroxypregnanes which possess enhanced anti-inflammatory, anti-arthritic, anti-allergic and progestational activities. These compounds are particularly superior to the 16β-epimers when used as intermediates in reactions requiring basic medias, since the 16β-bromo- or 16β-iodo-17α-hydroxypregnanes form with bases the corresponding 16α(17α)-oxidopregnane with elimination of hydrogen halide. The 16α-halo-17α-hydroxypregnanes do not undergo this elimination reaction.

The starting materials, 16β-bromo- and 16β-iodo-17α-hydroxypregnanes, are either known in the art, or described in this application. They are generally produced by the opening of a 16α(17α)-oxido bond of a pregnane compound with hydrogen bromide or, respectively, with hydrogen iodide. The 16α(17α)-oxidopregnane itself is produced by the reaction of a 16-pregnane compound with a peroxide, e.g., hydrogen peroxide, t-butyl hydroperoxide (U.S. Patent 3,014,905), with a peracid, e.g., peracetic acid, performic acid, perbenzoic acid, and the like.

In carrying out the process of the present invention the selected 16β-bromo- or respectively 16β-iodo-17α-hydroxypregnane is dissolved in an organic solvent and treated with activated nickel, e.g. Raney nickel, preferably, but not necessarily, under exclusion of oxygen, in an inert gas, e.g. a nitrogen atmosphere. The organic solvents used in this process are generally alcohols, ethers, organic acids and chlorinated organic compounds such as methanol ethanol, and propanol, isopropanol, t-butanol, tetrahydrofuran, diethylether, diisopropylether, ethyl acetate, butyl acetate, methyl propionate, chloroform, methylene chloride, chlorobenzene, and the like. In the preferred embodiment of this invention methanol is used as a solvent.

The reaction time and temperature may be varied widely. The optimum conditions depend somewhat on the nature of the substrate: thus, at room temperature the reaction is best carried out between 1 and 48 hours while at the boiling point of solvents the time required for the reaction to be completed is between 2 minutes and 120 minutes.

The amount of steroid to Raney nickel is usually varied between 0.5 part to 3 parts of Raney nickel per part of steroid to give optimum yield. However, ratios of 0.1 to 10 parts of Raney nickel to 1 part of steroid are operative.

The active nickel employed is generally commercially available Raney-active nickel catalyst and may be used as is or preferably may be neutralized with dilute aqueous acetic acid and washed with methanol or treated prior to use with hydrogen iodide or hydrogen bromide in aqueous methanol and washed with methanol or treated with hydrogen bromide in aqueous methanol and washed with methanol. Satisfactory high results were obtained, particularly when the Raney nickel was first neutralized with dilute aqueous acetic acid and washed with methanol. Nickel-chromium catalyst was also useful for carrying out the isomerization, but other Raney metals, cobalt, iron or copper, were less effective.

In a typical experiment a methanolic solution of one part of 16β-bromo- or 16β-iodo-17α-hydroxypregnane is heated under reflux and stirred with about an equal weight of Raney nickel for a period of 1 hour while the oxygen is displaced from the system with nitrogen gas. Thereafter the reaction mixture is cooled, filtered and the filtrate evaporated to dryness to give a residue. The product is recovered by direct crystallization of the above residue from organic solvents such as methanol, ethanol, Skellysolve B hexanes, ethyl acetate, heptane mixtures, octane mixtures, benzene, ether, and isopropyl ether. Purification and isolation may also be carried out by chromatography over Florisil anhydrous magnesium silicate and alumina prior to crystallization or recrystallization.

*Example 1.—16α-bromo-3β,17α-dihydroxy-6-methyl-5-pregnen-20-one*

A suspension of 16α,17α-odido-6-methylpregnenolone (U.S. Patent 2,878,247) (10 g.) in 20 ml. of methylene chloride was cooled to 0° C. and thereupon treated with 17.2 ml. of ether containing 2.58 g. of hydrogen bromide for a period of 2 minutes. After 5 minutes a solid began to separate and after standing overnight at room temperature the solid was filtered off and washed with methylene chloride to give 10.58 g. (85.6%) of 16β-bromo-3β,17α-dihydroxy-6-methyl-5-pregnen-20-one. A second crop of 0.39 g. (3.2%) could be obtained by evaporating the mother liquors and triturating the thus-obtained solids with methylene chloride.

Recrystallization of the thus-obtained 16β-bromo-3β,17α-dihydroxy-6-methyl-5-pregnen-20-one from methanol and subsequently from ethyl acetate gave prisms of pure 16β-bromo-3β,17α-dihydroxy-6-methyl-5-pregnen-20-one of melting point 207–210° C. with decomposition and rotation $[\alpha]_D$ —7° in dioxane, 0.9 molar solution, having an analysis as follows:

*Analysis.*—Calcd. for $C_{22}H_{33}O_3Br$: C, 62.11; H, 7.82; Br, 18.79. Found: C, 61.83; H, 7.65; Br, 18.71.

A suspension of 1 g. of finely powdered 16β-bromo-3β,17α-dihydroxy-6-methyl-5-pregnen-20-one in 20 ml. of methanol was treated with 3.5 g. of Raney nickel. The Raney nickel had previously been treated with a few drops of aqueous hydrogen bromide in methanol, boiled and washed with methanol. The reaction mixture thus obtained was refluxed in a nitrogen atmosphere with agitation for 25 minutes. After cooling, needles separated, which were redissolved by adding methylene chloride, the solution was filtered, thus removing the nickel and the thus-obtained filtrate concentrated to a small volume. To this filtrate was added a little water whereupon needles separated weighing 0.47 g. and consisting of 16α-bromo-3β,17α-dihydroxy-6-methyl-5-pregnen-20-one of melting point 220–222° C. These needles were further purified by recrystallization from methylene chloride-methanol to give pure 16α-bromo-3β,17α-dihydroxy-6-methyl-5-pregnen-20-one of melting point 225–227° C. and rotation $[\alpha]_D$ —37° in both chloroform and dioxane. The analysis of this pure 16α-bromo-3β,17α-dihydroxy-6-methyl-5-pregnen-20-one was as follows:

*Analysis.*—Calcd. for $C_{22}H_{33}O_3Br$: C, 62.11; H, 7.82; Br, 18.79. Found: C, 62.20; H, 7.87; Br, 18.48.

In the same manner 10 g. of 16β-bromo-3β,17α-dihydroxy-6-methyl-5-pregnen-20-one were refluxed with 5 g. of Raney nickel (pretreated with acetic acid and then boiled with methanol) in 50 ml. of metanol under stirring for a period of 27 minutes. The mixture was thereupon concentrated to about ⅓ of the volume by removing the condenser, then cooled to room temperature over a period of 1 hour, filtered and washed with a very little methanol and the solids extracted with 400 ml. of 10% methanol in methylene chloride. The nickel was removed by filtration. Concentration of the filtrate and extracts after addiiton of methanol and further concentration gave 5.10 g. of 16α-bromo-3β,17α-dihydroxy-6-methyl-5-pregnen-20-one of melting point 222–225° C., which by additional purification through crystallization from methylene chloride-methanol, gave 16α-bromo-3β,17α-dihydroxy-6-methyl-5-pregnen-20-one of melting point 225–227° C. as above.

Concentration of the mother liquors gave a second crop of needles (2.45 g.) of 16α-bromo-3β,17α-dihydroxy-6-methyl-5-pregnen-20-one and a third crop of 0.45 g. of the desired material. The total yield was 8 g.

*Example 2.—16α-iodo-3β,17α-dihydroxy-6-methyl-5-pregnen-20-one*

6-methyl-16α,17α-oxidopregnenolone (10 g.) in 100 ml. of dioxane, purified over anhydrous alumina, were stirred at room temperature (22–25° C.) while 20 ml. of 47% aqueous hydroiodic acid was added during a period of 3 minutes. The mixture was thereupon stirred overnight in a nitrogen atmosphere. Thereafter 125 ml. of water was added slowly over a period of 30 minutes under continuous stirring and seeding. After a further 20 minutes, the solids which separated were filtered off and washed on the filter with water. These solids were dried in vacuo at 40° C. to give 12.6 g. of material melting at 172° C. Recrystallizing this material from ethyl acetate containing enough methanol to dissolve the starting material gave a first crop of 8.6 g. of 16β-iodo-3β,17α-dihydroxy-6-methyl-5-pregnen-20-one of melting point 179° C. with decomposition and a second crop of 1.2 g. of melting point 177° C. with decomposition.

Recrystallization of this 16β-iodo-3β,17α-dihydroxy-6-methyl-5-pregnen-20-one from methylene dichloride and Skellysolve B hexanes gave pure 16β-iodo-3β,17α-dihydroxy-6-methyl-5-pregnen-20-one of melting point 185–186° C. with decomposition and having a rotation of $[\alpha]_D$ —16° in chloroform. The analysis of this material is as follows:

*Analysis.*—Calcd. for $C_{22}H_{33}O_3I$: C, 55.93; H, 7.04; I, 26.87. Found: C, 55.68; H, 7.07; I, 27.05.

A mixture of 1 g. of 16β-iodo-3β,17α-dihydroxy-6-methyl-5-pregnen-20-one, 10 ml. of methanol and 3.3 g. of Raney nickel (previously boiled in methanol with 47% hydrogen iodide, decanted and washed with methanol) was refluxed for a period of 15 minutes, then cooled, diluted with methylene chloride and filtered. The filtrate was diluted with methanol, concentrated and further diluted with water giving a precipitate which was recrystallized from methylene chloride-Skellysolve B hexanes to give 0.4 g. of 16α-iodo-3β,17α-dihydroxy-6-methyl-5-pregnen-20-one of melting point 230–233° C., rotation $[\alpha]_D$ —41° in chloroform and having an analysis as follows:

*Analysis.*—Calcd. for $C_{22}H_{33}IO_3$: C, 55.93; H, 7.04; I, 26.87. Found: C, 55.58; H, 6.96; I, 26.79.

*Example 3.—16α-bromo-3β,17α,21-trihydroxy-5-pregnen-20-one-3,21-diacetate*

A solution of 16α,17α-oxido-3β,21-diacetoxy-5-pregnen-20-one [5 g. prepared as described by P. L. Julian et al., J. Am. Chem. Soc., 72, 5145 (1950)] in 17 ml. of glacial acetic acid was treated at room temperature with 2.92 g. of hydrogen bromide in acetic acid and after 10 minutes was treated with 60 ml. of water to precipitate crude 16β-bromo-3β,17α,21-trihydroxy-5-pregnen-20-one 3,21-diacetate. This product was recovered from the reaction mixture by filtration. The crude material was recrystallized from methylene chloride-Skellysolve B hexanes to give 16β-bromo-3β,17α,21-trihydroxy-5-pregnen-20-one 3,21-diacetate of melting point 169–171° C., which upon recrystallizaiton from Skellysolve B hexanes have pure 16β-bromo-3β,17α,21-trihydroxy-5-pregnen-20-one 3,21-diacetate of melting point 170–172° C., rotation $[\alpha]_D$ —24° and having an analysis as follows:

*Analysis.*—Calcd. for $C_{25}H_{35}O_6Br$: C, 58.71; H, 6.89; Br, 15.62. Found: C, 58.76; H, 7.08; Br, 16.30.

A mixture of 0.50 g. of thus-obtained 16β-bromo-3β,17α,21-trihydroxy-5-pregnen-3-one 3,21-diacetate, 0.25 g. of Raney nickel and 20 ml. of methanol was heated under reflux for a few minutes. The mixture was thereupon concentrated to about 5 ml. and refluxed further for 4 hours. The mixture was then concentrated to a smaller volume, cooled, filtered and the filtrate discarded, then the solids remaining on the filter were extracted with methylene chloride and methanol. These extracts were then evaporated to give a solid which was repeatedly crystallized from methanol to give pure 16α-bromo-3β,17α,21-trihydroxy-5-pregnen-20-one 3,21-diacetate of melting point 220–222° C., rotation $[\alpha]_D$ —36° in chloroform and having an analysis as follows:

*Analysis.*—Calcd. for $C_{25}H_{35}O_6Br$: C, 58.71; H, 6.89; Br. 15.62. Found: C, 58.97; H, 7.01; Br, 15.74.

Example 4

In the same manner given in the preceding Examples 1–3, other 16α(17α)-oxidopregnanes can be treated with hydrogen bromide to give the corresponding 16β-bromo-17α-pregnane and isomerized with Raney nickel in methanol, ethanol, tetrahydrofuran, ethylether or other organic solvents to give the corresponding 16α-bromo-17α-hydroxypregnanes. In this manner there were obtained from:

(a) 3α-acetoxy-16α(17α)-oxidopregnane-11,20 - dione [Percy Julian, Recent Progress in Hormone Research, vol. VI, Academic Press, Inc., publishers, New York, 1951, page 200] first 3α-acetoxy-16β-bromo-17α-hydroxypregnane-11,20-dione, and then 3α-acetoxy-16α-bromo-17α-hydroxypregnane-11,20-dione.

(b) 3β-hydroxy-16α(17α)-oxido - 4 - pregnene-11,20-dione [Percy Julian, Recent Progress in Hormone Research, vol. VI, Academic Press, Inc., publishers, New York, 1951, page 200] first 3β-hydroxy-16β-bromo-17α-hydroxy-4-pregnene-11,20-dione, and then 3β-hydroxy-16α-bromo-17α-hydroxy-4-pregnene-11,20-dione.

(c) 16α(17α)-oxido-21-acetoxy-4 - pregnene - 3,20-dione [ibid., page 201] first 16β-bromo-17α-hydroxy-21-acetoxy-4-pregnene-3,20-dione, and then 16α-bromo-17α-hydroxy-21-acetoxy-4-pregnene-3,20-dione.

(d) 16α(17α)-oxido-21 - acetoxy - 4-pregnene-3,11,20-trione [ibid., page 206] first 16β-bromo-17α-hydroxy-21-acetoxy-4-pregnene-3,11,20-trione, and then 16α-bromo-17α-hydroxy-21-acetoxy-4-pregnene-3,11,20-trione.

(e) 16α(17α)-oxido-21 - acetoxy-4,9(11)-pregnadiene-3,20-dione [Heller et al., J. Org. Chem. 26, 5044 (1961)] first 16β-bromo-17α-hydroxy-21-acetoxy-4,9(11)-pregnadiene-3,20-dione, then 16α-bromo-17α-hydroxy-21-acetoxy-4,9(11)-pregnadiene-3,20-dione.

Example 5

In the same manner given in the preceding Examples 1–3, other 16α(17α)-oxidopregnanes can be treated with hydrogen iodide to give the corresponding 16β-iodo-17α-pregnane and isomerized with Raney nickel in methanol, ethanol, tetrahydrofuran, ethylether or other organic solvents to give the corresponding 16α-iodo-17α-hydroxypregnanes. In this manner there was obtained from:

(a) 3α-acetoxy-16α(17α)-oxidopregnane-11,20 - dione [Percy Julian, Recent Progress in Hormone Research, vol. VI, Academic Press, Inc., publishers, New York, 1951, page 200] first 3α-acetoxy-16β-iodo-17α-hydroxypregnane-11,20-dione and then 3α-acetoxy-16α-iodo-17α-hydroxypregnane-11,20-dione.

(b) 3β-hydroxy-16α(17α)-oxido - 4 - pregnene-11,20-dione [Percy Julian, Recent Progress in Hormone Research, vol. VI, Academic Press, Inc., publishers, New York, 1951, page 200] first 3β-hydroxy-16β-iodo-17α-hydroxy-4-pregnene-11,20-dione, and then 3β-hydroxy-16α-iodo-17α-hydroxy-4-pregnene-11,20-dione.

(c) 16α(17α)-oxido-21-acetoxy-4 - pregnene - 3,20-dione [ibid., page 201] first 16β-iodo-17α-hydroxy-21-acetoxy-4-pregnene-3,20-dione, and then 16α-iodo-17α-hydroxy-21-acetoxy-4-pregnene-3,20-dione.

(d) 16α(17α) - oxido-21-acetoxy-4-pregnene-3,11,20-trione [ibid., page 206] first 16β-iodo-17α-hydroxy-21-acetoxy-4-pregnene-3,11,20-trione, and then 16α-iodo-17α-hydroxy-21-acetoxy-4-pregnene-3,11,20-trione.

(e) 16α(17α)-oxido-21 - acetoxy-4,9(11)-pregnadiene-3,20-dione [Heller et al., J. Org. Chem. 26, 5044 (1961)] first 16β-iodo-17α-hydroxy - 21 - acetoxy-4,9(11)-pregnadiene-3,20-dione, then 16α-iodo-17α-hydroxy-21-acetoxy-4,9(11)-pregnadiene-3,20-dione.

I claim:
1. A process for the production of 16α-halo-17α-hydroxypregnanes, wherein the halogen is selected from the group consisting of bromine and iodine, which comprises: treating with 0.1 to 10 parts of active nickel catalyst one part of a 16β-halo-17α-hydroxypregnane wherein the halogen is defined as above at a temperature between 0° and 125°, to obtain the corresponding 16α-halo-17α-hydroxypregnane, wherein the halogen is defined as above.

2. A process for the production of 16α-halo-17α-hydroxypregnanes, wherein the halogen is selected from the group consisting of bromine and iodine, which comprises: treating with 0.5 to 3 parts of Raney nickel at a temperature between 0° and 125°, one part of a 16β-halo-17α-hydroxypregnane, wherein the halogen is defined as above, to obtain the corresponding 16α-halo-17α-hydroxypregnane.

3. A process for the production of 16α-halo-17α-hydroxypregnanes, wherein the halogen is selected from the group consisting of bromine and iodine, which comprises: treating with 0.5 to 3 parts of Raney nickel one part of a 16β-halo-17α-hydroxypregnane, wherein the halogen is defined as above, in an organic solvent at a temperature between 0° and 125°, to obtain the corresponding 16α-halo-17α-hydroxypregnane.

4. A process for the production of 16α-halo-17α-hydroxypregnanes, wherein the halogen is selected from the group consisting of bromine and iodine, which comprises: treating in an inert gas atmosphere with 0.5 to 3 parts of Raney nickel one part of a 16β-halo-17α-hydroxypregnane, wherein the halogen is defined as above, at a temperature between 0° and 125°, to obtain the corresponding 16α-halo-17α-hydroxypregnane.

5. A process for the production of 16α-bromo-3β,17α-dihydroxy-6-methyl-5-pregnen-20 - one which comprises: treating one part of 16β-bromo-3β,17α-dihydroxy-6-methyl-5-pregnen-20-one with 0.5 to 3 parts of Raney nickel, at a temperature between 0° and 125°, to obtain 16α-bromo-3β,17α-dihydroxy-6-methyl-5-pregnen-20-one.

6. A process for the production of 16α-iodo-3β,17α-dihydroxy-6-methyl-5-pregnen-20 - one which comprises: treating one part of 16β-iodo-3β,17α-dihydroxy-6-methyl-5-pregnen-20-one with 0.5 to 3 parts of Raney nickel, at a temperature between 0° and 125°, to obtain 16α-iodo-3β,17α-dihydroxy-6-methyl-5-pregnen-20-one.

7. A process for the production of 16α-bromo-3β,17α,21-trihydroxy-5-pregnen-20-one 3,21-diacetate which comprises: treating one part of 16β-bromo-3β,17α,21-trihydroxy-5-pregnen-20-one 3,21-diacetate with 0.5 to 3 parts of Raney nickel, at a temperature between 0° and 125°, to obtain 16α-bromo-3β,17α,21-trihydroxy-5-pregnen-20-one 3,21-diacetate.

References Cited by the Examiner
UNITED STATES PATENTS 3,022,295 2/62 Berg et al. _____ 260—239.55
3,105,069 9/63 Komeno et al. _____ 260—239.55

LEWIS GOTTS, *Primary Examiner.*